US011025398B2

(12) United States Patent
Zhu et al.

(10) Patent No.: US 11,025,398 B2
(45) Date of Patent: Jun. 1, 2021

(54) REMOTE INTERFERENCE DETERMINATION ASSISTANCE

(71) Applicant: QUALCOMM Incorporated, San Diego, CA (US)

(72) Inventors: Xipeng Zhu, San Diego, CA (US); Huilin Xu, San Diego, CA (US); Tingfang Ji, San Diego, CA (US)

( * ) Notice: Subject to any disclaimer, the term of this patent is extended or adjusted under 35 U.S.C. 154(b) by 25 days.

(21) Appl. No.: 16/523,452

(22) Filed: Jul. 26, 2019

(65) Prior Publication Data
US 2020/0036500 A1    Jan. 30, 2020

Related U.S. Application Data

(60) Provisional application No. 62/711,868, filed on Jul. 30, 2018.

(51) Int. Cl.
| H04L 5/00 | (2006.01) |
| H04W 72/04 | (2009.01) |
| H04W 64/00 | (2009.01) |
| H04W 72/08 | (2009.01) |
| H04B 7/26 | (2006.01) |

(52) U.S. Cl.
CPC ......... *H04L 5/0073* (2013.01); *H04B 7/2643* (2013.01); *H04W 64/006* (2013.01); *H04W 72/0413* (2013.01); *H04W 72/082* (2013.01)

(58) Field of Classification Search
CPC .................................................... H04B 7/2643
USPC ......................................................... 370/280
See application file for complete search history.

(56) References Cited

U.S. PATENT DOCUMENTS

| 2010/0317339 | A1* | 12/2010 | Koc | ........................ | H04L 5/0007 |
| | | | | | 455/424 |
| 2011/0045856 | A1* | 2/2011 | Feng | ................... | H04W 72/082 |
| | | | | | 455/501 |
| 2014/0148179 | A1* | 5/2014 | Das | ....................... | H04B 1/7107 |
| | | | | | 455/452.1 |

FOREIGN PATENT DOCUMENTS

WO     2013178037 A1    12/2013

OTHER PUBLICATIONS

Liu et al., "IoT Control Based on Uplink Inter-Cell Power Control in LTE System", 2014 IEEE 25th International Symposium on Personal, Indoor and Mobile Radio Communications (Year: 2014).*
International Search Report and Written Opinion—PCT/US2019/043815—ISA/EPO—dated Dec. 5, 2019.

(Continued)

*Primary Examiner* — Jamaal Henson

(57) ABSTRACT

Certain aspects of the present disclosure provide techniques for remote interference determination at a first base station based on assistance from one or more neighboring base stations of the first base station. Certain aspects provide a method for wireless communication by a first base station (BS). The method includes receiving from a second BS neighboring the first BS an uplink interference report request. The method further includes transmitting to the second BS an uplink interference report in response to the uplink interference report request, the uplink interference report comprising information indicative of uplink interference caused by one or more user equipments communicating on an uplink with the first BS.

30 Claims, 7 Drawing Sheets

(56) References Cited

OTHER PUBLICATIONS

Liu J., et al., "IoT Control based on Uplink Inter-Cell Power Control in LTE System", 2014 IEEE 25th International Symposium on Personal, Indoor and Mobile Radio Communications (PIMRC), IEEE, Sep. 2, 2014, pp. 717-721, XP032789688, DOI: 10.1109/PIMRC.2014.7136258 [retrieved on Jun. 25, 2015], abstract, paragraph [00I.]—paragraph [III.].

Qualcomm Incorporated: "Mechanisms for Improving Network Robustness", 3GPP Draft; R1-1813430 Mechanisms for Improving Network Robustness, 3rd Generation Partnership Project (3GPP), Mobile Competence Centre, 650, Route Des Lucioles, F-06921 Sophia-Antipolis Cedex, France, vol. RAN WG1, No. Spokane, Washington; Nov. 12, 2018-Nov. 16, 2018 Nov. 11, 2018, XP051555469, Retrieved from: URL:http://www.3gpp.org/ftp/Meetings%5F3GPP%5FSYNC/RAN1/Docs/R1%2D1813430%2Ezip [retrieved on Nov. 11, 2018], para. 2-5, 5 pages.

Qualcomm Incorporated: "Remote Interference Detection", 3GPP Draft; R3-185514 Remote Interference Detection, 3rd Generation Partnership Project (3GPP), Mobile Competence Centre, 650, Route Des Lucioles, F-06921 Sophia-Antipolis Cedex, France, vol. RAN WG3, No. Chengdu, China; Oct. 8, 2018-Oct. 12, 2018, Sep. 29, 2018, XP051528789, Retrieved from the Internet: URL:http://www.3gpp.org/ftp/tsg%5Fran/WG3%5Fiu/TSGR3%5F101bis/Docs/R3%2D185514%2Ezip [retrieved on Sep. 29, 2018], 4 pages.

\* cited by examiner

REMOTE INTERFERENCE DETERMINATION ASSISTANCE

CROSS-REFERENCE TO RELATED APPLICATIONS

This application claims benefit of and priority to U.S. Provisional Patent Application Ser. No. 62/711,868, filed Jul. 30, 2018, herein incorporated by reference in its entirety as if fully set forth below and for all applicable purposes.

BACKGROUND

Field of the Disclosure

Aspects of the present disclosure relate to wireless communications, and more particularly, to techniques for remote interference determination.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first base station (BS). The method includes detecting interference at the first base station. The method further includes transmitting to at least one neighboring BS of the first BS an uplink interference report request. The method further includes receiving from the at least one neighboring BS an uplink interference report in response to the uplink interference report request, the uplink interference report comprising information indicative of uplink interference caused by one or more user equipments communicating on an uplink with the neighboring BS. The method further includes determining, based on the uplink interference report, whether the detected interference is caused by communications associated with the at least one neighboring BS or with a remote BS.

Certain aspects provide a method for wireless communication by a first base station (BS). The method includes receiving from a second BS neighboring the first BS an uplink interference report request. The method further includes transmitting to the second BS an uplink interference report in response to the uplink interference report request, the uplink interference report comprising information indicative of uplink interference caused by one or more user equipments communicating on an uplink with the first BS.

Certain aspects provide a first base station (BS) comprising a memory and a processor coupled to the memory. The processor is configured to detect interference at the first base station. The processor is further configured to transmit to at least one neighboring BS of the first BS an uplink interference report request. The processor is further configured to receive from the at least one neighboring BS an uplink interference report in response to the uplink interference report request, the uplink interference report comprising information indicative of uplink interference caused by one or more user equipments communicating on an uplink with the neighboring BS. The processor is further configured to determine, based on the uplink interference report, whether the detected interference is caused by communications associated with the at least one neighboring BS or with a remote BS.

Certain aspects provide a first base station (BS) comprising a memory and a processor coupled to the memory. The processor is configured to receive from a second BS neighboring the first BS an uplink interference report request. The processor is further configured to transmit to the second BS an uplink interference report in response to the uplink interference report request, the uplink interference report comprising information indicative of uplink interference caused by one or more user equipments communicating on an uplink with the first BS.

Certain aspects provide a first base station (BS). The first BS includes means for detecting interference at the first base station. The first BS further includes means for transmitting to at least one neighboring BS of the first BS an uplink interference report request. The first BS further includes means for receiving from the at least one neighboring BS an uplink interference report in response to the uplink interference report request, the uplink interference report comprising information indicative of uplink interference caused by one or more user equipments communicating on an uplink with the neighboring BS. The first BS further includes means for determining, based on the uplink interference report, whether the detected interference is caused by communications associated with the at least one neighboring BS or with a remote BS.

Certain aspects provide a non-transitory computer readable medium having instructions stored thereon for causing a first base station (BS) to perform a method for wireless communication. The method includes detecting interference at the first base station. The method further includes transmitting to at least one neighboring BS of the first BS an uplink interference report request. The method further includes receiving from the at least one neighboring BS an uplink interference report in response to the uplink interference report request, the uplink interference report comprising information indicative of uplink interference caused by one or more user equipments communicating on an uplink with the neighboring BS. The method further includes determining, based on the uplink interference report, whether the detected interference is caused by communications associated with the at least one neighboring BS or with a remote BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
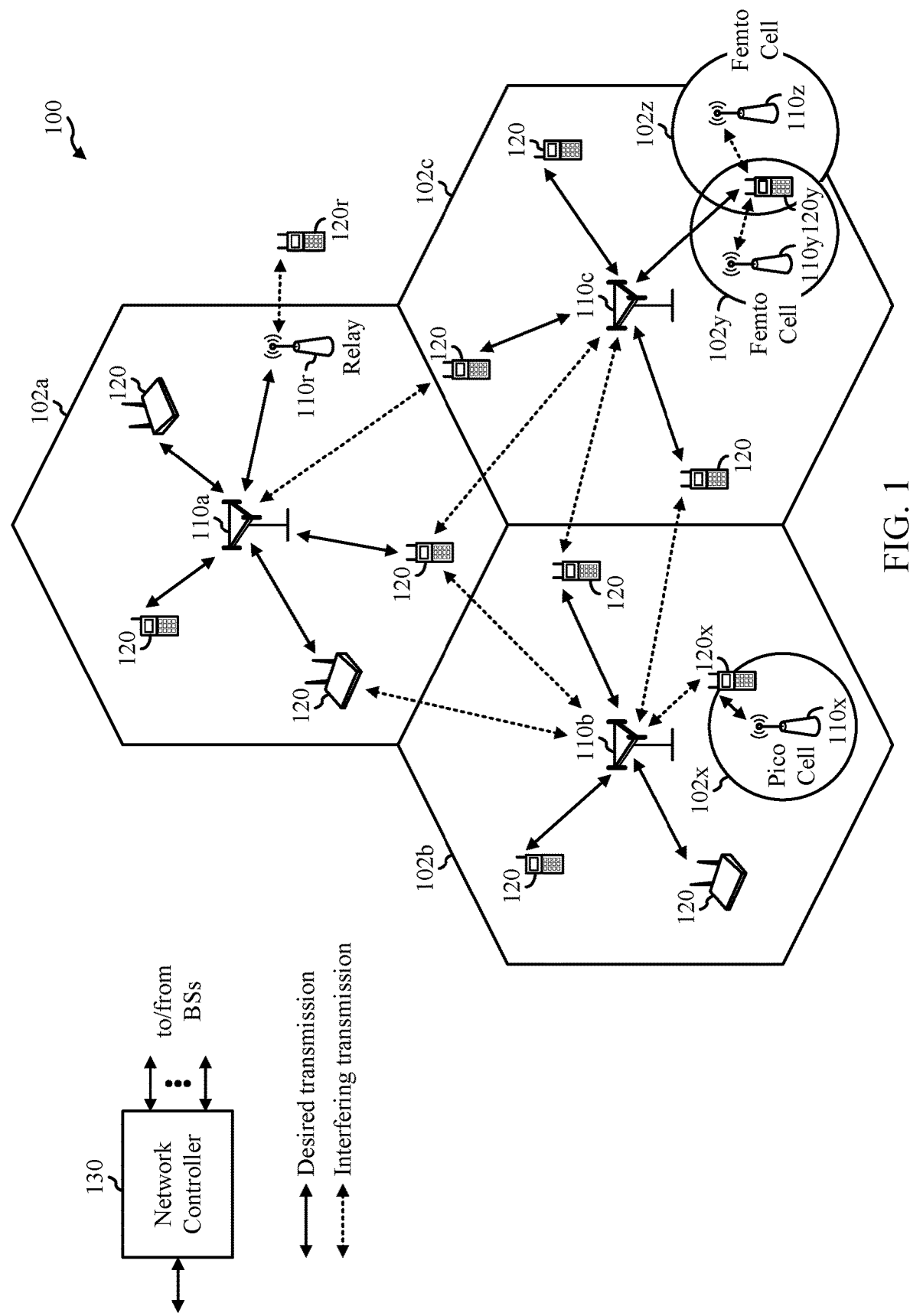
FIG. 1 is a block diagram conceptually illustrating an example telecommunications system, in accordance with certain aspects of the present disclosure.

Aspects of the present disclosure present disclosure provide apparatus, methods, processing systems, and computer readable mediums for remote interference determination at a first base station based on assistance from one or more neighboring base stations of the first base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, BSs 110 may perform remote interference detection as discussed herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things devices, which may be narrowband Internet-of-Things devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
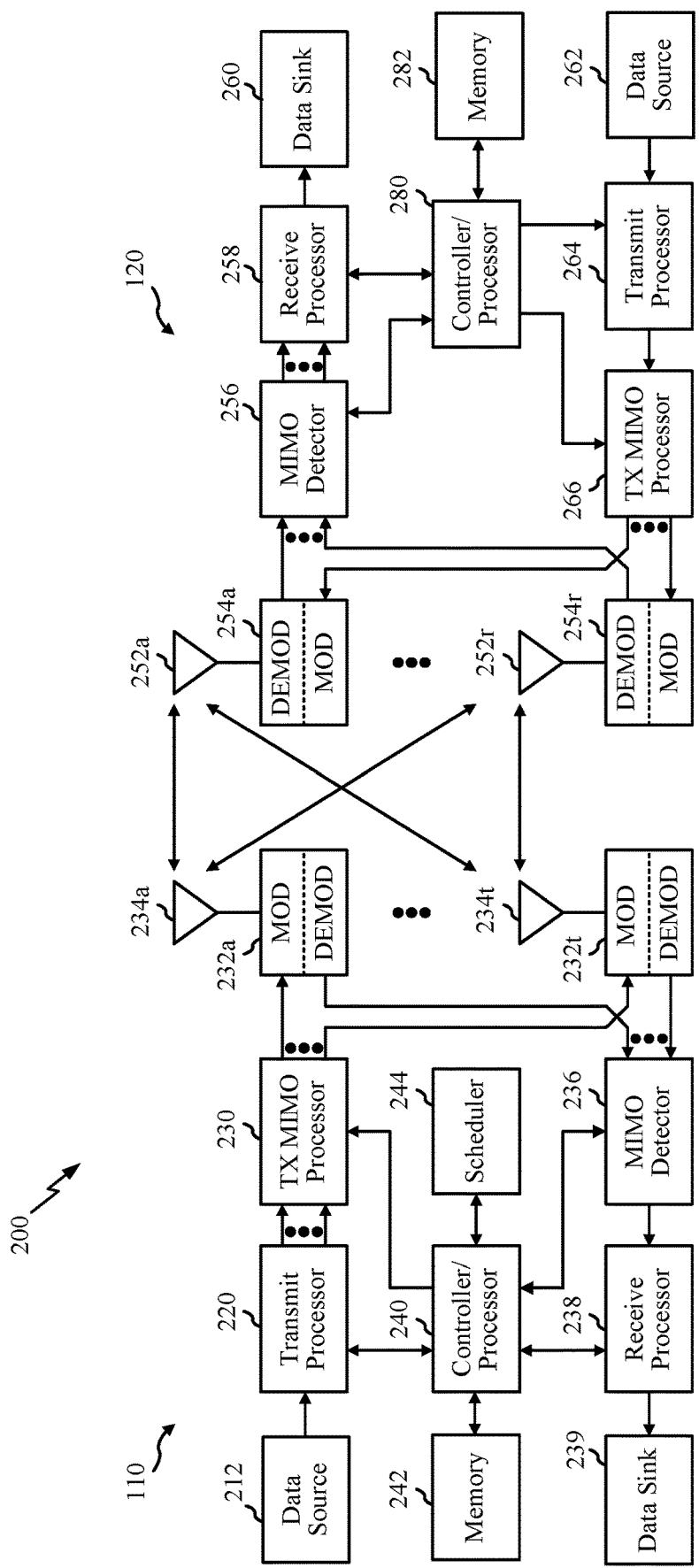
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 260, 238, and/or controller/processor 240 of the BS 110 may be used to perform the various techniques and methods described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a* through 254*r* (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Remote Interference Determination Assistance

Remote interference is a type of cross-link interference that may occur in a telecommunication system. In particular, in remote interference, DL transmissions of a first or remote base station (sometimes referred to as the "aggressor") become interference to the UL reception of another base station (sometimes referred to as the "victim"). Accordingly, the DL transmissions of the aggressor may interfere with the ability of the victim to successfully receive and decode UL transmissions (e.g., random access channel (RACH) signals such as physical RACH (PRACH), etc.) from UEs in the cell of the victim. For example, though normally antennas of a base station are oriented (e.g., tilted down) to try and ensure DL transmissions from the base station are only observable in the cell of the base station, that is not always the case. For example, the DL transmissions from the base station may be reflected (e.g., on a mountain, ocean, cloud, etc.) to a distance greater than the cell of the base station.

Figure 3:
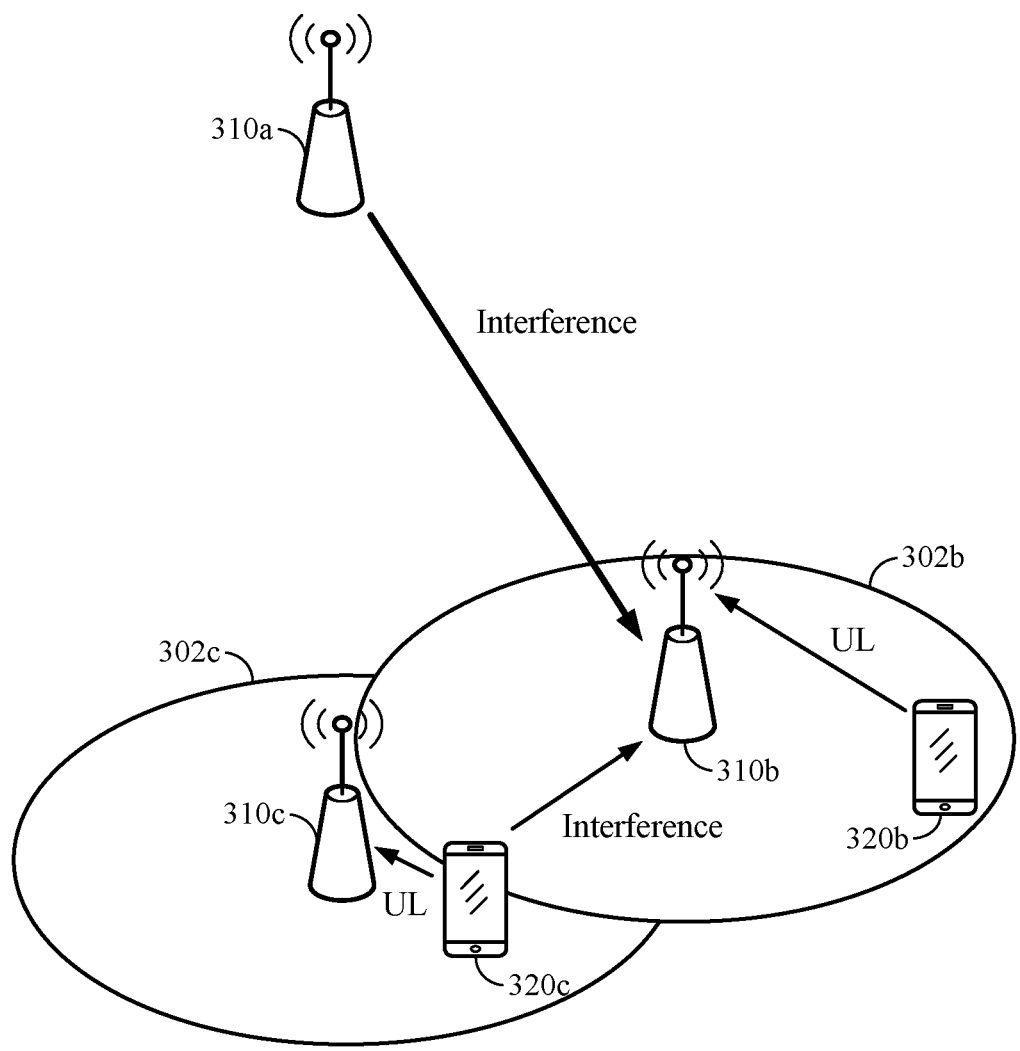
FIG. 3 illustrates remote interference that may occur in a telecommunication system, in accordance with certain aspects of the present disclosure.

FIG. 3 illustrates remote interference that may occur in a telecommunication system. FIG. 3 shows a first BS 310*a* (e.g., a BS 110 as shown and described in FIG. 1) and a second BS 310*b* with a coverage area shown by cell 302*b*. FIG. 3 further shows a UE 320*b* (e.g., a UE 120 as shown and described in FIG. 1) connected to second BS 310*b*.

In certain aspects, as illustrated in FIG. 3, DL transmissions from BS 310*a* (i.e., the aggressor) may interfere with UL transmissions from UE 320*b* to BS 310*b* (i.e., the victim) at BS 310*b*. In particular, the DL transmissions from BS 310*a* may be received at BS 310*b* and interfere with the UL transmissions from UE 320*b* received at BS 310*b*. Such remote interference between UL and DL transmissions may cause problems and poor performance. Interference may not only occur in the same channel, but also across adjacent channels.

In certain aspects, to overcome such remote interference between UL and DL transmissions, the transmission direction (e.g., UL and DL) may be aligned (also referred to as synchronized) between deployments (e.g., BSs 310*a* and 310*b*), meaning that both BSs 310*a* and 310*b* schedule UL transmissions at the same time and DL transmissions at the same time, so DL transmissions cannot interfere with UL transmissions. Accordingly, large guard bands are not needed between channels used for DL and UL, meaning the spectrum resources are utilized efficiently. However, the deployments of BS 310*a* and 310*b* may then be restricted from using different UL/DL configuration timings, which may impact performance as a strict configuration must always be adhered to.

Further, in certain cases, even if the BSs 310*a* and 310*b* are synchronized, there may still be remote interference. For example, DL transmissions from an aggressor BS 310*a* may be received with a delay (e.g., due to the path taken by the DL transmissions) at the victim BS 310*b*, such that the DL transmissions are received in a time period used for UL communication by the victim BS 310*b*.

Accordingly, certain aspects herein relate to determining that interference experienced at a victim BS is due to remote interference from DL transmission of a remote aggressor BS. In certain aspects, the victim BS and/or aggressor BS may then perform remote interference management (RIM) based on determining that interference experienced at a victim BS is due to remote interference from DL transmission of a remote aggressor BS. In particular, the victim BS and/or aggressor BS perform RIM to mitigate interference at the victim BS. For example, in certain embodiments, the victim BS may inform the aggressor BS of the remote interference (e.g., over the air, using a reference signal, via a backhaul, etc.). The aggressor BS may then reduce transmission power of its transmission on the DL, not transmit on certain resources on the DL (e.g., not transmit on later time resources allocated to DL in a slot), etc. The victim BS may not schedule UL transmissions for its UEs on certain resources on the UL (e.g., not transmit on earlier time resources allocated to UL in a slot), not transmit on certain resources on the DL (e.g., not transmit on later time resources allocated to DL in a slot) (such as to avoid causing interference at the aggressor BS), etc.

In certain aspects, a victim BS is configured to perform or trigger RIM when it detects remote interference (referred to as remote interference detection) from an aggressor BS. For example, in certain aspects, if the victim BS detects interference levels above a threshold amount during resources scheduled for UL communication, the victim BS may trigger RIM. In certain aspects, the victim BS detects if an interference over thermal noise (IoT) level measured at the victim BS during resources scheduled for UL communication is above a threshold level (e.g., above an absolute threshold, rises by more than a threshold level, etc.).

However, the IoT level measured at the victim BS can be affected by more than just remote interference from an aggressor BS. The IoT level measured at the victim BS can also be affected by the UL transmissions (e.g., being intra-frequency with UL transmissions from UEs associated with the victim BS) of UEs communicating in neighboring cells with neighboring BSs of the victim BS. A neighboring cell/BS of a victim BS may refer to an adjacent or geographically proximate cell/BS to the victim BS.

For example, FIG. 3 shows a neighboring BS 310c to BS 310b. The neighboring BS 310c has a coverage area shown by neighboring cell 302c that neighbors and in this case partially overlaps with cell 302b of BS 310b. FIG. 3 further shows a UE 320c connected to BS 310c. In certain aspects, as illustrated in FIG. 3, UL transmissions from UE 320c in neighboring cell 302c may also interfere with UL transmissions from UE 320b to BS 310b at BS 310b, or at least the UL transmission from UE 320c may reach BS 310b. Accordingly, the UL transmissions from UEs such as UE 320c in neighboring cell 302c can raise/affect the IoT level measured at the victim BS 310b.

The victim BS 310b may have difficulty determining by itself whether the reason the IoT level is above a threshold level is due to communications associated with the at least one neighboring BS 310c (e.g., UL transmissions from UE 320c communicating with neighboring BS 310c) or due to communications associated with remote BS 310a (e.g., DL transmissions from BS 310a). Accordingly, the victim BS 310b may have difficulty determining whether to trigger RIM as it is unclear whether the IoT level is above the threshold level due to remote interference or not.

Accordingly, certain aspects herein provide techniques for remote interference determination at a first base station (e.g., victim BS) based on assistance from one or more neighboring base stations of the first base station.

In certain aspects, a neighboring BS (e.g., neighboring BS 310c) (e.g., that has intra-frequency UL transmissions with UL transmissions of the victim BS) is configured to estimate interference of the UL transmissions from its associated UEs (e.g., UE 320c) (also referred to as UL traffic) to the victim BS (e.g., victim BS 310b). Further, the neighboring BS 310c is configured to report the estimated interference to the victim BS 310b. For example, the neighboring BS 310c sends information indicative of uplink interference caused by one or more user equipments communicating on an uplink with the neighboring BS 310c to the victim BS 310b.

For example, the neighboring BS 310c schedules UL transmission of its associated UEs 320c. Accordingly, the neighboring BS 310c has information regarding one or more parameters of uplink transmissions of each of its associated UEs. In certain aspects, the one or more parameters comprise one or more of transmission power, waveform design, and UE location. In certain aspects, the neighboring BS 310c further has information regarding a location of the victim BS 310b (e.g., receives such information from the network, from victim BS 310b over a backhaul, etc.). Utilizing the one or more parameters of uplink transmissions of each of its associated UEs (e.g., and the location of the victim BS 310b), the neighboring BS 310c estimates the interference of the UL transmissions from its associated UEs on the victim BS (also referred to as an uplink interference level).

For example, the neighboring BS 310c determines the distance between each of its associated UEs and victim BS 310b, and based on the one or more parameters of uplink transmissions estimates path loss for the uplink transmissions. In certain aspects, the neighboring BS 310c determines estimated path loss for the uplink transmissions between its associated UEs and victim BS 310b as follows. First, each of the associated UEs of neighboring BS 310c can measure downlink path loss between victim BS 310b and the UE. Each of the associated UEs reports its measured downlink path loss to neighboring BS 310c. The neighboring BS 310c then estimates the path loss for uplink transmissions from a given UE as the corresponding downlink path loss reported, such as in a TDD system.

Based on the estimated path loss and the transmit power of the uplink transmissions, and/or optionally the UEs locations, the UEs transmit beam directions, the victim BS 310b location, and/or the victim BS 310b beam configuration), the neighboring BS 310c estimates the uplink interference level likely to occur at the victim BS 310b. For example, the neighboring BS 310c aggregates the estimated interference of each of its associated UEs and uses the aggregate as the estimated uplink interference level likely to occur at the victim BS 310b.

In certain aspects, the neighboring BS 310c estimates an absolute uplink interference level at the victim BS 310b, meaning it is an absolute level not relative to another level. Further, in certain aspects, the information indicative of uplink interference sent by the neighboring BS 310c to the victim BS 310b includes an estimate of an absolute uplink interference level of each of the one or more user equipments (e.g., separately or an aggregate).

In certain aspects, the neighboring BS 310c estimates a relative uplink interference level at the victim BS 310b. For example, neighboring BS 310c estimates a change in uplink interference level from a previously reported uplink interference level. Further, in certain aspects, the information indicative of uplink interference sent by the neighboring BS 310c to the victim BS 310b includes an estimate of a relative uplink interference level of each of the one or more user equipments (e.g., separately or an aggregate).

In certain aspects, the neighboring BS 310c estimates uplink interference level at the victim BS 310b separately for separate sub-bands and/or bandwidth parts (or other sets of frequency) used for UL transmissions. Further, in certain aspects, the information indicative of uplink interference sent by the neighboring BS 310c to the victim BS 310b includes a per sub-band or per bandwidth part uplink interference level of each of the one or more user equipments (e.g., separately or an aggregate).

In certain aspects, the neighboring BS 310c estimates uplink interference level at the victim BS 310b for different time periods. For example, the neighboring BS 310c may estimate uplink interference level at the victim BS 310b for a time period that occurred at a previous time (e.g., in the past) based on past scheduled UL transmissions and associated parameters. In another, the neighboring BS 310c may estimate uplink interference level at the victim BS 310b for a time period that occurs at a future time based on future scheduled UL transmissions and associated parameters. Further, in certain aspects, the information indicative of uplink interference sent by the neighboring BS 310c to the victim BS 310b includes a timing associated with the uplink interference level of each of the one or more user equipments (e.g., separately or an aggregate).

In certain aspects, the neighboring BS 310c measures IoT level at the neighboring BS 310c and reports such measured interference level to the victim BS 310b, such as indicative of remote interference experienced by the BS 310c that the victim BS 310b may experience. For example, if the measured IoT level at the BS 310c is similar (e.g., within a threshold) as that of the victim BS 310b, the victim BS 310b may determine that the measured IoT level being above the threshold at the victim BS 310b is due to remote interference and not UL transmissions from neighboring cell 302c. If the measured IoT level at the BS 310c is not similar (e.g., not within a threshold) as that of the victim BS 310b, the victim BS 310b may determine that the measured IoT level being above the threshold at the victim BS 310b may be in part due to UL transmissions from neighboring cell 302c. The measured IoT level may similarly be used as an estimated uplink interference level as it is still indirectly indicative of uplink interference caused by one or more user equipments communicating on an uplink with the neighboring BS. Accordingly, in certain aspects, the measured IoT level is an example of an estimated uplink interference level as well, and used in the same manner according to the techniques provided herein. For example, in certain aspects, the information indicative of uplink interference sent by the neighboring BS 310*c* to the victim BS 310*b* includes a measured IoT level at the neighboring BS 310*c*.

Figure 4:
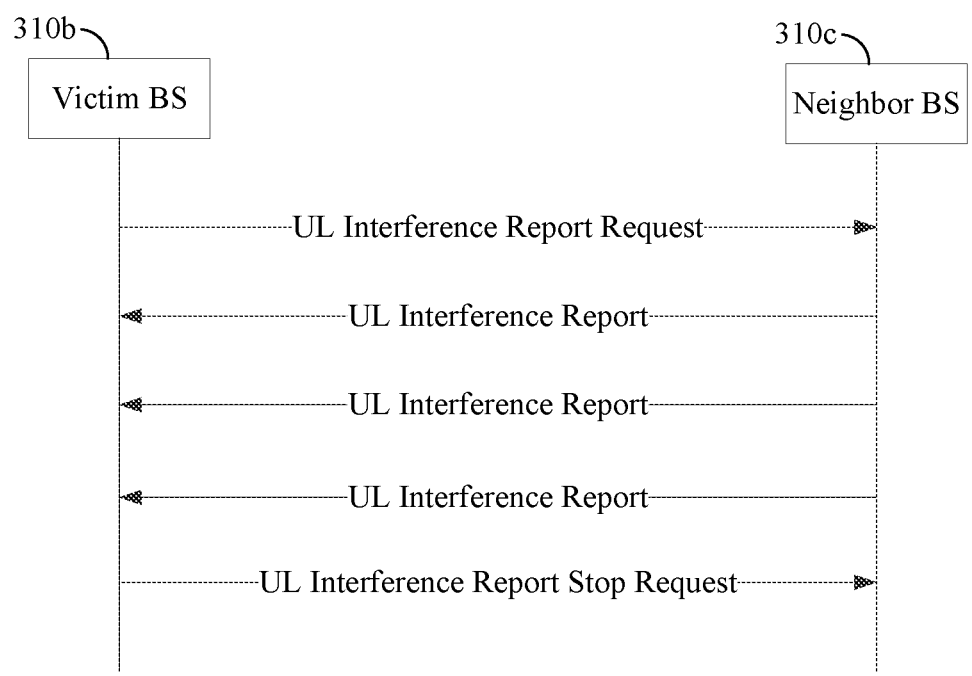
FIG. 4 illustrates a message flow diagram for assisted remote interference detection in accordance with aspects of the present disclosure.

FIG. 4 illustrates a message flow diagram for assisted remote interference detection in accordance with aspects of the present disclosure. It should be noted that the exchange of messages shown in the message flow diagram may be performed over the air, via a wired connect (e.g., backhaul), etc.

In certain aspects, victim BS 310*a* detects interference at the victim BS 310*a*. For example, the victim BS 310*a* detects an interference over thermal noise level above a threshold. Accordingly, in certain aspects as shown in FIG. 8, victim BS 310*a* transmits to at least one neighboring BS 310*c* (e.g., broadcasts to many neighboring BS, unicasts, etc.) an UL interference report request. The UL interference report request includes an indication requesting the at least one neighboring BS 310*c* to transmit to the victim BS 310*a* an UL interference report. In certain aspects, the UL interference report request further includes an explicit indication to periodically transmit the UL interference report. In certain aspects, the explicit indication indicates a periodicity to transmit with. In certain aspects, the indication requesting the at least one neighboring BS 310*c* to transmit to the victim BS 310*a* an UL interference report implicitly indicates to periodically transmit the UL interference report. In certain aspects, the periodicity is configured by other means.

Accordingly, as shown, the at least one neighboring BS 310*c* transmits one or more UL interference reports (e.g., periodically) to the victim BS 310*a* based on receiving the UL interference report request. In certain aspects, the UL interference report includes information indicative of uplink interference as determined by the at least one neighboring BS 310*c* as discussed herein.

In certain aspects, the at least one neighboring BS 310*c* is configured to keep transmitting (e.g., periodically) UL interference reports to the victim BS 310*a* until the victim BS 310*a* indicates to the at least one neighboring BS 310*c* to stop. Accordingly, as shown, in certain aspects the victim BS 310*a* transmits a stop request to stop transmission of the uplink interference report by the at least one neighboring BS. The at least one neighboring BS 310*c* stops transmitting the uplink interference report based on receiving the stop request.

In certain aspects, the victim BS 310*a* is configured to determine, based on the UL interference report, whether the detected interference is caused by communications associated with the at least one neighboring BS 310*c* or with a remote BS (e.g., aggressor BS 310*a*). For example, the victim BS 310*a* is configured to deduct (e.g., subtract) the uplink interference indicated in the UL interference report from the interference level detected by the victim BS 310*a* at the victim BS 310*a* to determine a remaining interference. Further, the victim BS 310*a* is configured to determine whether the remaining interference is periodic and has a cycle aligned with a time division duplex uplink/downlink configuration of the victim BS 310*a*. The victim BS 310*a* determines the detected interference is associated with the remote BS if the remaining interference is periodic and has the cycle aligned with the time division duplex uplink/downlink configuration of the victim BS 310*a*. For example, if the remaining interference is periodic and has the cycle aligned with the time division duplex uplink/downlink configuration of the victim BS 310*a*, it is likely due to scheduled transmissions such as from remote BS on the DL, and not some other interference that is temporary. The victim BS 310*a* determines the detected interference is associated with the at least one neighboring BS 310*c* if the remaining interference is not periodic or does not have the cycle aligned with the time division duplex uplink/downlink configuration of the victim BS 310*a*.

In certain aspects, the victim BS 310*a* mitigates/manages interference by the remote BS based on determining the detected interference is caused by communications associated with the remote BS. For example, the victim BS 310*a* performs or triggers RIM as discussed herein.

Figure 5:
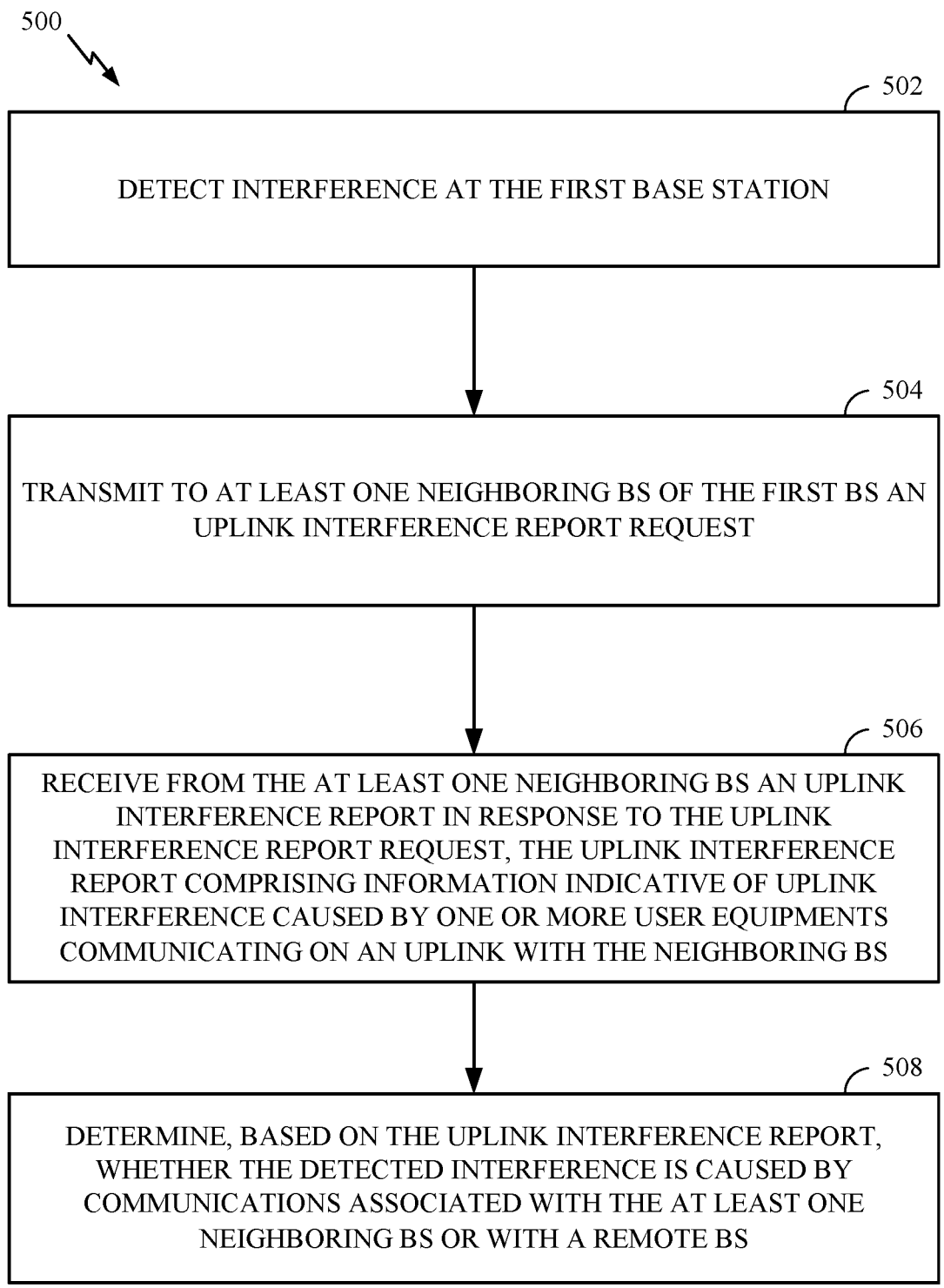
FIG. 5 illustrates example operations that may be performed by a wireless device for remote interference detection in accordance with aspects of the present disclosure.

FIG. 5 illustrates example operations that may be performed by a wireless device (e.g., BS 110/310) for remote interference management in accordance with aspects of the present disclosure. Operations 500 may be performed by a victim BS referred to as a first BS.

Operations 500 begin, at block 502, by detecting interference at the first base station. At block 504, operations 500 continue by transmitting to at least one neighboring BS of the first BS an uplink interference report request. At block 506, the first BS receives from the at least one neighboring BS an uplink interference report in response to the uplink interference report request, the uplink interference report comprising information indicative of uplink interference caused by one or more user equipments communicating on an uplink with the neighboring BS. At block 508, the first BS determines, based on the uplink interference report, whether the detected interference is caused by communications associated with the at least one neighboring BS or with a remote BS.

Figure 6:
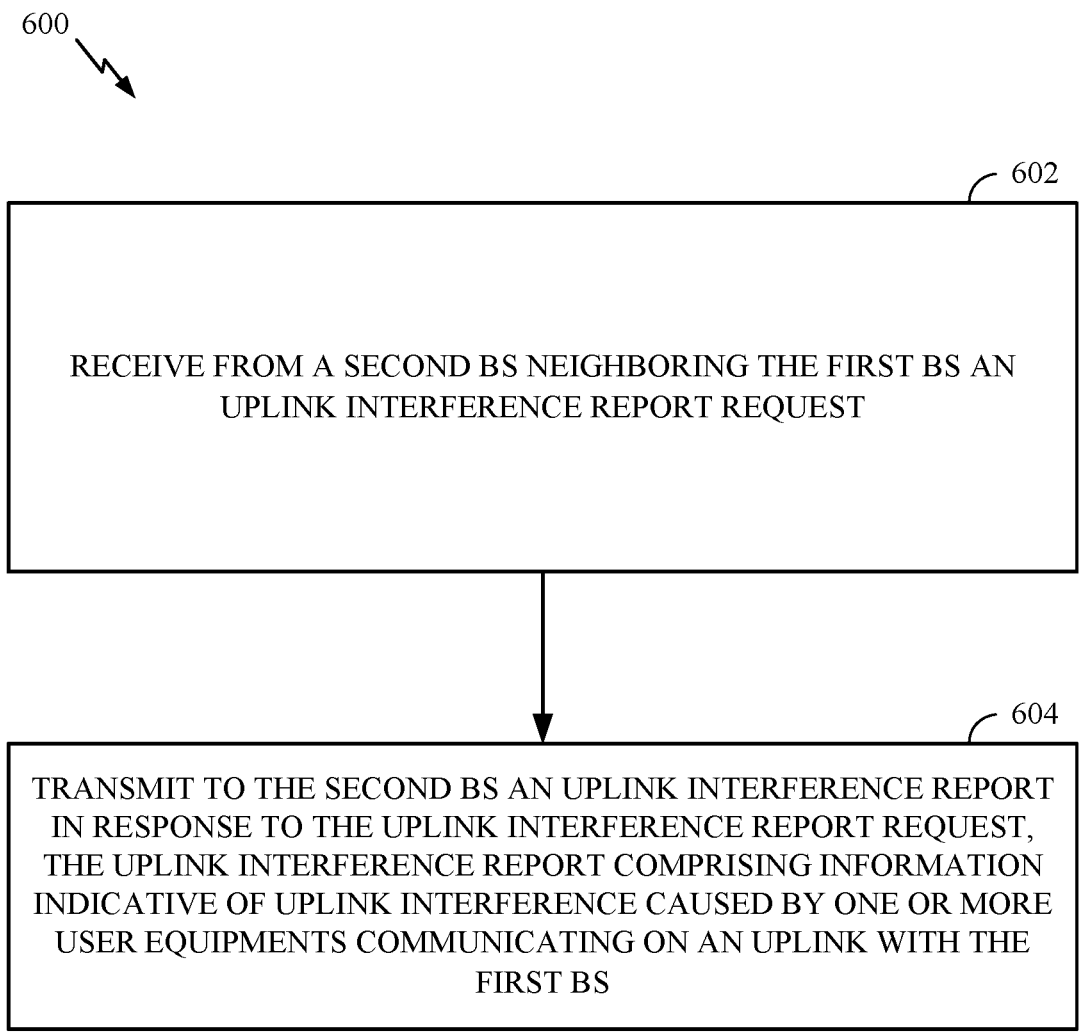
FIG. 6 illustrates example operations that may be performed by a wireless device for remote interference detection in accordance with aspects of the present disclosure.

FIG. 6 illustrates example operations that may be performed by a wireless device (e.g., BS 110/310) for remote interference management in accordance with aspects of the present disclosure. Operations 600 may be performed by a neighboring BS (referred to as a first BS) to a victim BS (referred to as a second BS).

Operations 600 begin, at block 602, by receiving from a second BS neighboring the first BS an uplink interference report request. At block 604, operations 600 continue by transmitting to the second BS an uplink interference report in response to the uplink interference report request, the uplink interference report comprising information indicative of uplink interference caused by one or more user equipments communicating on an uplink with the first BS.

Figure 7:
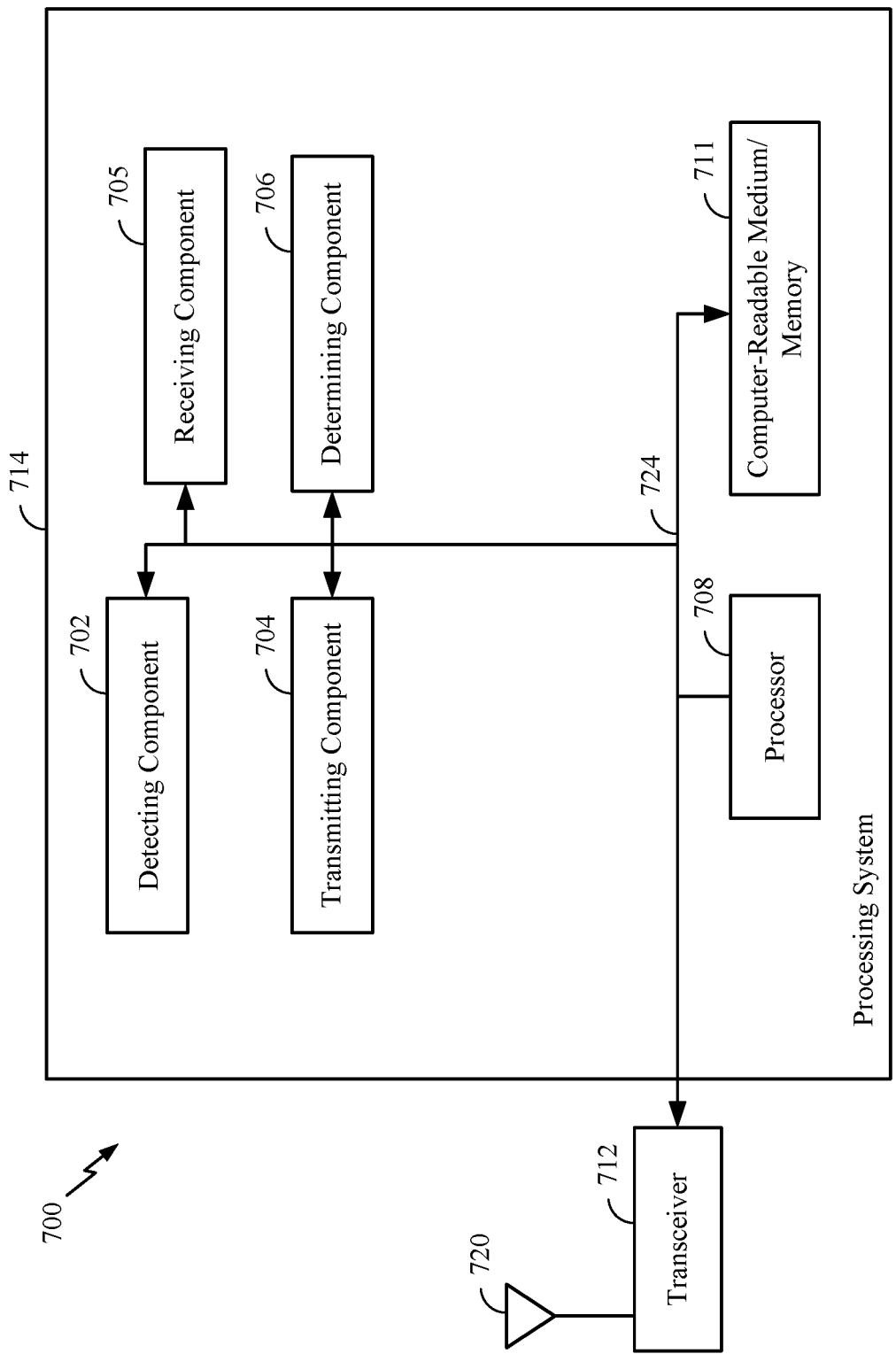
FIG. 7 illustrates a communications device that may include various components configured to perform operations for the techniques disclosed herein, in accordance with aspects of the present disclosure.

FIG. 7 illustrates a communications device 700 that may include various components (e.g., corresponding to means-plus-function components) configured to perform operations for the techniques disclosed herein, such as the operations illustrated in FIGS. 5 and/or 6. The communications device 700 includes a processing system 714 coupled to a transceiver 712. The transceiver 712 is configured to transmit and receive signals for the communications device 700 via an antenna 720, such as the various signal described herein. The processing system 714 may be configured to perform processing functions for the communications device 700, including processing signals received and/or to be transmitted by the communications device 700.

The processing system 714 includes a processor 708 coupled to a computer-readable medium/memory 711 via a bus 724. In certain aspects, the computer-readable medium/memory 711 is configured to store instructions that when executed by processor 708, cause the processor 708 to perform the operations illustrated in FIGS. 5 and/or 6, or other operations for performing the various techniques discussed herein.

In certain aspects, the processing system 714 further includes a detecting component 702 for performing the operations illustrated at block 502 in FIG. 5. Additionally, the processing system 714 includes a transmitting component 704 for performing the operations illustrated at block 504 in FIG. 5 and/or block 604 in FIG. 6. The processing system 714 also includes a receiving component 705 for performing the operations illustrated at block 506 in FIG. 5 and/or block 602 in FIG. 6. The processing system 714 also includes a determining component 706 for performing the operations illustrated at 508 in FIG. 5. The detecting component 702, transmitting component 704, receiving component 705, and determining component 706 may be coupled to the processor 708 via bus 724. In certain aspects, the detecting component 702, transmitting component 704, receiving component 705, and determining component 706 may be hardware circuits. In certain aspects, the detecting component 702, transmitting component 704, receiving component 705, and determining component 706 may be software components that are executed and run on processor 708.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5 and/or 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first base station (BS), the method comprising:
   detecting interference at the first base station;
   transmitting to at least one neighboring BS of the first BS an uplink interference report request;
   receiving from the at least one neighboring BS an uplink interference report in response to the uplink interference report request, the uplink interference report comprising information indicative of uplink interference caused by one or more user equipments communicating on an uplink with the neighboring BS; and
   determining, based on the uplink interference report, whether the detected interference is caused by communications associated with the at least one neighboring BS or with a second BS.

2. The method of claim 1, wherein detecting the interference comprises detecting an interference over thermal noise level above a threshold.

3. The method of claim 1, wherein determining whether the detected interference is caused by communications associated with the at least one neighboring BS or with the second BS comprises:
   deducting the uplink interference from the detected interference to determine a remaining interference;
   determining whether the remaining interference is periodic and has a cycle aligned with a time division duplex uplink/downlink configuration of the first base station;
   determining the detected interference is associated with the second BS if the remaining interference is periodic and has the cycle aligned with the time division duplex uplink/downlink configuration of the first base station; and
   determining the detected interference is associated with the at least one neighboring BS if the remaining interference is not periodic or does not have the cycle aligned with the time division duplex uplink/downlink configuration of the first base station.

4. The method of claim 1, wherein the information indicative of uplink interference comprises an estimate of an absolute uplink interference level of each of the one or more user equipments, wherein the neighboring BS estimates the absolute uplink interference level of each of the one or more user equipments based on one or more parameters of uplink transmission by each of the one or more user equipments, wherein the one or more parameters comprise one or more of transmission power, waveform design, user equipment location, or beam information.

5. The method of claim 1, wherein the information indicative of uplink interference comprises a change in uplink interference level from a previously reported uplink interference level.

6. The method of claim 1, wherein the information indicative of uplink interference comprises a per sub-band or per bandwidth part uplink interference level.

7. The method of claim 1, wherein the information indicative of uplink interference comprises information indicative of a timing associated with the uplink interference, wherein the timing indicates one of the uplink interference occurred at a previous time or the uplink interference is an estimate for a future time.

8. The method of claim 1, further comprising mitigating interference by the second BS based on determining the detected interference is caused by communications associated with the second BS.

9. The method of claim 1, wherein the neighboring BS estimates the uplink interference caused by the one or more user equipments by:
receiving from each of the one or more user equipments a corresponding measurement of downlink path loss between the corresponding user equipment and the first BS;
estimating uplink path loss for each of the one or more user equipments based on the corresponding measurement of downlink path loss; and
estimating uplink interference for each of the one or more user equipments based on the corresponding estimated uplink path loss and corresponding one or more parameters of uplink transmission.

10. The method of claim 9, wherein the one or more parameters comprise one or more of UE transmission power, UE waveform design, UE transmit beam direction, first BS beam configuration, UE location, or first BS location.

11. A first base station (BS) comprising:
a memory; and
a processor couple to the memory, the processor being configured to:
detect interference at the first base station;
transmit to at least one neighboring BS of the first BS an uplink interference report request;
receive from the at least one neighboring BS an uplink interference report in response to the uplink interference report request, the uplink interference report comprising information indicative of uplink interference caused by one or more user equipments communicating on an uplink with the neighboring BS; and
determine, based on the uplink interference report, whether the detected interference is caused by communications associated with the at least one neighboring BS or with a second BS.

12. The first BS of claim 11, wherein to detect the interference comprises to detect an interference over thermal noise level above a threshold.

13. The first BS of claim 11, wherein to determine whether the detected interference is caused by communications associated with the at least one neighboring BS or with the second BS comprises to:
deduct the uplink interference from the detected interference to determine a remaining interference;
determine whether the remaining interference is periodic and has a cycle aligned with a time division duplex uplink/downlink configuration of the first base station;
determine the detected interference is associated with the second BS if the remaining interference is periodic and has the cycle aligned with the time division duplex uplink/downlink configuration of the first base station; and
determine the detected interference is associated with the at least one neighboring BS if the remaining interference is not periodic or does not have the cycle aligned with the time division duplex uplink/downlink configuration of the first base station.

14. The first BS of claim 11, wherein the information indicative of uplink interference comprises an estimate of an absolute uplink interference level of each of the one or more user equipments, wherein the neighboring BS estimates the absolute uplink interference level of each of the one or more user equipments based on one or more parameters of uplink transmission by each of the one or more user equipments, wherein the one or more parameters comprise one or more of transmission power, waveform design, user equipment location, or beam information.

15. The first BS of claim 11, wherein the information indicative of uplink interference comprises a change in uplink interference level from a previously reported uplink interference level.

16. The first BS of claim 11, wherein the information indicative of uplink interference comprises a per sub-band or per bandwidth part uplink interference level.

17. The first BS of claim 11, wherein the information indicative of uplink interference comprises information indicative of a timing associated with the uplink interference, wherein the timing indicates one of the uplink interference occurred at a previous time or the uplink interference is an estimate for a future time.

18. The first BS of claim 11, wherein the processor is further configured to mitigate interference by the second BS based on determining the detected interference is caused by communications associated with the second BS.

19. The first BS of claim 11, wherein the neighboring BS estimates the uplink interference caused by the one or more user equipments by:
receiving from each of the one or more user equipments a corresponding measurement of downlink path loss between the corresponding user equipment and the first BS;
estimating uplink path loss for each of the one or more user equipments based on the corresponding measurement of downlink path loss; and
estimating uplink interference for each of the one or more user equipments based on the corresponding estimated uplink path loss and corresponding one or more parameters of uplink transmission.

20. The first BS of claim 19, wherein the one or more parameters comprise one or more of UE transmission power, UE waveform design, UE transmit beam direction, first BS beam configuration, UE location, or first BS location.

21. A first base station (BS) comprising:
means for detecting interference at the first base station;
means for transmitting to at least one neighboring BS of the first BS an uplink interference report request;
means for receiving from the at least one neighboring BS an uplink interference report in response to the uplink interference report request, the uplink interference report comprising information indicative of uplink interference caused by one or more user equipments communicating on an uplink with the neighboring BS; and means for determining, based on the uplink interference report, whether the detected interference is caused by communications associated with the at least one neighboring BS or with a second BS.

22. The first BS of claim 21, wherein means for detecting the interference comprises means for detecting an interference over thermal noise level above a threshold.

23. The first BS of claim 21, wherein means for determining whether the detected interference is caused by communications associated with the at least one neighboring BS or with the second BS comprises:

means for deducting the uplink interference from the detected interference to determine a remaining interference;

means for determining whether the remaining interference is periodic and has a cycle aligned with a time division duplex uplink/downlink configuration of the first base station;

means for determining the detected interference is associated with the second BS if the remaining interference is periodic and has the cycle aligned with the time division duplex uplink/downlink configuration of the first base station; and means for determining the detected interference is associated with the at least one neighboring BS if the remaining interference is not periodic or does not have the cycle aligned with the time division duplex uplink/downlink configuration of the first base station.

24. The first BS of claim 21, wherein the information indicative of uplink interference comprises an estimate of an absolute uplink interference level of each of the one or more user equipments, wherein the neighboring BS estimates the absolute uplink interference level of each of the one or more user equipments based on one or more parameters of uplink transmission by each of the one or more user equipments, wherein the one or more parameters comprise one or more of transmission power, waveform design, user equipment location, or beam information.

25. The first BS of claim 21, wherein the information indicative of uplink interference comprises a change in uplink interference level from a previously reported uplink interference level.

26. A non-transitory computer readable medium having instructions stored thereon for causing a first base station (BS) to perform a method comprising:

detecting interference at the first base station;

transmitting to at least one neighboring BS of the first BS an uplink interference report request;

receiving from the at least one neighboring BS an uplink interference report in response to the uplink interference report request, the uplink interference report comprising information indicative of uplink interference caused by one or more user equipments communicating on an uplink with the neighboring BS; and determining, based on the uplink interference report, whether the detected interference is caused by communications associated with the at least one neighboring BS or with a second BS.

27. The non-transitory computer readable medium of claim 26, wherein detecting the interference comprises detecting an interference over thermal noise level above a threshold.

28. The non-transitory computer readable medium of claim 26, wherein determining whether the detected interference is caused by communications associated with the at least one neighboring BS or with the second BS comprises:

deducting the uplink interference from the detected interference to determine a remaining interference;

determining whether the remaining interference is periodic and has a cycle aligned with a time division duplex uplink/downlink configuration of the first base station;

determining the detected interference is associated with the second BS if the remaining interference is periodic and has the cycle aligned with the time division duplex uplink/downlink configuration of the first base station; and determining the detected interference is associated with the at least one neighboring BS if the remaining interference is not periodic or does not have the cycle aligned with the time division duplex uplink/downlink configuration of the first base station.

29. The non-transitory computer readable medium of claim 26, wherein the information indicative of uplink interference comprises an estimate of an absolute uplink interference level of each of the one or more user equipments, wherein the neighboring BS estimates the absolute uplink interference level of each of the one or more user equipments based on one or more parameters of uplink transmission by each of the one or more user equipments, wherein the one or more parameters comprise one or more of transmission power, waveform design, user equipment location, or beam information.

30. The non-transitory computer readable medium of claim 26, wherein the information indicative of uplink interference comprises a change in uplink interference level from a previously reported uplink interference level.

* * * * *